(12) United States Patent
Kumar et al.

(10) Patent No.: US 6,511,640 B1
(45) Date of Patent: Jan. 28, 2003

(54) PURIFICATION OF GASES

(75) Inventors: Ravi Kumar, Allentown, PA (US); Shuguang Deng, Somerville, NJ (US)

(73) Assignee: The BOC Group, Inc., Murray Hill, NJ (US)

(*) Notice: Subject to any disclaimer, the term of this patent is extended or adjusted under 35 U.S.C. 154(b) by 9 days.

(21) Appl. No.: 09/606,886

(22) Filed: Jun. 29, 2000

(51) Int. Cl.[7] ............................................. B01D 53/00
(52) U.S. Cl. ................... 423/210; 423/230; 423/239.1; 423/245.1; 423/247; 423/248; 423/437.2; 95/117; 95/129; 95/139; 95/141
(58) Field of Search ........................... 95/117, 129, 139, 95/141; 423/210, 230, 245.1, 247, 248, 239.1, 437.2

(56) References Cited

U.S. PATENT DOCUMENTS

| | | | |
|---|---|---|---|
| 3,961,919 A | 6/1976 | Lamoreaux | 55/184 |
| 5,110,569 A | 5/1992 | Jain | 423/230 |
| 5,202,096 A | 4/1993 | Jain | 422/190 |
| 5,728,198 A | 3/1998 | Acharya et al. | 95/114 |
| 5,906,675 A | 5/1999 | Jain et al. | 95/99 |
| 5,914,455 A * | 6/1999 | Jain et al. | 95/96 |
| 5,919,286 A * | 7/1999 | Golden et al. | 95/98 |
| 6,048,509 A | 4/2000 | Kawai et al. | 423/230 |
| 6,074,621 A | 6/2000 | Hsiung et al. | 423/247 |
| 6,077,488 A | 6/2000 | Jain et al. | 423/210 |
| 6,106,593 A * | 8/2000 | Golden et al. | 95/120 |
| 6,113,869 A * | 9/2000 | Jain et al. | 423/219 |

OTHER PUBLICATIONS

D. Nakajima, H. Honda, Y. Ishihara, M. Hirokawa for JP 2000024464 Jan. 25, 2000 "Method and Apparatus for Producing Highly Clean Dry Air for Industrial Use", *Abstract* Chem. Abst. No. 132:66118.

* cited by examiner

Primary Examiner—Stanley S. Silverman
Assistant Examiner—Timothy C. Vanoy
(74) Attorney, Agent, or Firm—Philip H. Von Neida; Salvatore P. Pace

(57) ABSTRACT

A process for producing a purified gaseous product from a gaseous feedstream such as air containing impurities is disclosed. The impurities such as hydrogen, water vapor, carbon monoxide and carbon dioxide are removed from the gaseous feedstream in a vessel having layers of adsorbents and oxidation catalysts. The placement of the hydrogen to water vapor conversion catalyst downstream of the step of contacting the feedstream with a catalyst to convert the carbon monoxide to the carbon dioxide and the step of removing the carbon dioxide from the feedstream improves not only performance but also the economies of the purification system.

15 Claims, 1 Drawing Sheet

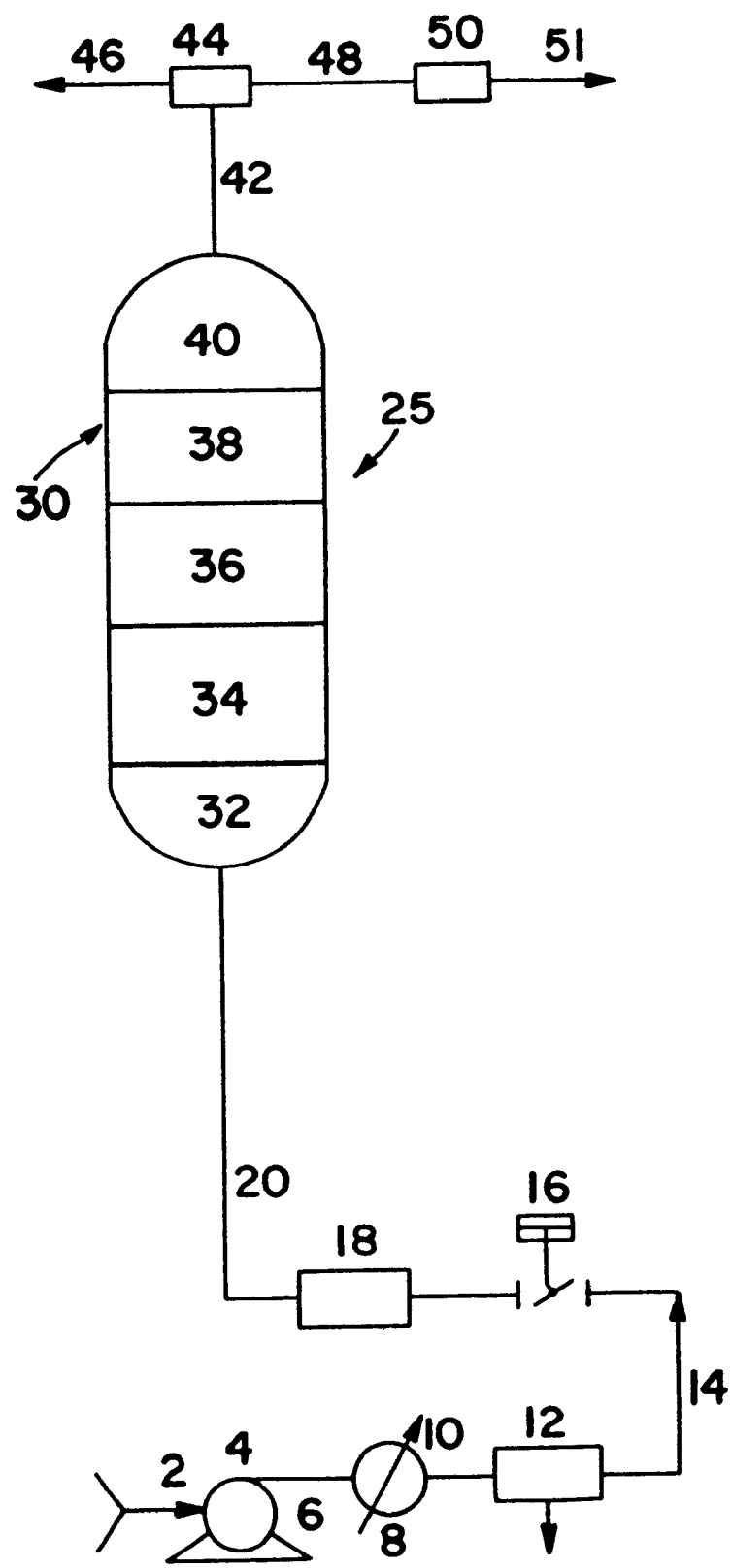

PURIFICATION OF GASES

FIELD OF THE INVENTION

The present invention relates to a method for removing gaseous impurities from feed gas streams in a temperature swing adsorption pre-purification unit. More particularly, the present invention provides for a method to remove $H_2$, $H_2O$, CO, $CO_2$ and additionally hydrocarbons and oxides of nitrogen from gas feedstreams such as air.

BACKGROUND OF THE INVENTION

High purity gases such as nitrogen in which impurities are present in amounts well below part per million levels are required in the manufacture of integrated circuits to prevent defects in chips of increasing line densities. Cryogenic distillation is typically used for the production of highly purified nitrogen gas.

Removal of impurities from the feed gas for cryogenic distillation is required for the production of high purity nitrogen. When air is used as the feed gas, impurities, such as $H_2O$ and $CO_2$, have to be removed to prevent freeze-up in the low temperature sections of the plant while other impurities, such as $H_2$ and CO, have to be removed to prevent contamination of the nitrogen product.

A two-step procedure has been employed for the removal of these impurities from air in a nitrogen production process. In the first step, a compressed feed gas is heated to temperatures between 150° to 250° C. and then contacted with a catalyst to oxidize CO to $CO_2$ and $H_2$ to $H_2O$. Noble metal catalysts, typically based on platinum, are commonly used for the oxidation step. In the second step, the oxidization products, $CO_2$ and $H_2O$, are removed from the compressed gas stream either by a temperature-swing or pressure swing adsorption process.

These processes, although effective, are disadvantageous for the commercial scale production of highly purified gases, particularly nitrogen gas due to their high cost of operation. The cost of operation is high because of the extensive use of expensive noble metal catalysts. In addition, separate vessels must be used for the catalytic treatment step and the adsorption step to remove the impurities. In addition, heat exchangers are required to both heat the gas as it passes into the catalyst vessel and cool the effluent therefrom. This poses additional costs, both in terms of equipment and energy.

Low temperature processes for removing parts per million levels of impurities from inert gas streams are also known in the art.

The present inventors have discovered that the use of a multi-layer bed where the trace impurities, primarily $CO_2$, are removed prior to contacting the gaseous feedstream with the $H_2$ catalyst will improve the performance of the $H_2$ catalyst. This not only improves overall performance but also reduces the amount of $H_2$ catalyst necessary in the process.

SUMMARY OF THE INVENTION

The present invention provides for a process for producing a gaseous product substantially purified from impurities comprising the steps of:

a) removing water vapor from a gaseous feedstream containing impurities;

b) contacting the gaseous feedstream with an oxidation catalyst to convert CO to $CO_2$;

c) removing $CO_2$ from the gaseous feedstream of steps (a) and (b);

d) contacting the gaseous feedstream of step (c) with an oxidation catalyst to convert $H_2$ to $H_2O$; and e) removing $H_2O$ from the gaseous feedstream of step (d), thereby obtaining the substantially purified gaseous product.

Optionally, an additional stage can be added between steps (c) and (d) whereby hydrocarbons and oxides of nitrogen are removed from the gaseous feedstream.

In another embodiment of the present invention, a gaseous product substantially purified from impurities is obtained by:

a) removing water vapor from the gaseous feedstream containing impurities;

b) removing $CO_2$ from the gaseous feedstream of step (a);

c) contacting the gaseous feedstream of step (b) with an oxidation catalyst to convert CO to $CO_2$;

d) contacting the gaseous feedstream of step (c) with an oxidation catalyst to convert $H_2$ to $H_2O$;

e) removing $H_2O$ and $CO_2$ from the gaseous feedstream of steps (c) and (d), thereby obtaining the substantially purified gaseous product.

Optionally, the additional stage to remove hydrocarbons and oxides of nitrogen from the gaseous feedstream may be added between steps (b) and (c).

Typically, the gaseous product obtained is air in a temperature swing adsorption (TSA) process prior to the air being fed to a cryogenic distillation unit in an air separation unit (ASU). The regeneration gas employed in a typical TSA process needs to be free of $H_2$, CO, $CO_2$, $H_2O$, oxides of nitrogen and hydrocarbons.

The gaseous feedstream is treated in a single treatment zone, preferably in a single vessel which includes two catalyst sections and three adsorbent sections. The first section contains one or more beds of a water-removing adsorbent such as activated alumina, silica gel, zeolites, or combinations thereof. The first catalytic layer for converting CO to $CO_2$ may be a mixture of manganese and copper oxides or nickel oxides.

The second adsorbent section contains an adsorbent for removing $CO_2$ from a gaseous feedstream. This adsorbent may be zeolites, activated alumina, silica gel and combinations thereof.

The section of the vessel used for converting $H_2$ to $H_2O$ contains an oxidation catalyst. This catalyst is preferably a noble metal catalyst such as supported palladium. The last layer contains an adsorbent for removing water and/or carbon dioxide which may be zeolites, activated alumina, silica gel and combinations thereof.

BRIEF DESCRIPTION OF THE DRAWINGS

The following drawing is merely illustrative of the invention and should not be construed as limit the scope thereof.

FIG. 1 is a schematic view of one embodiment of the invention showing a process for the production of highly purified gas.

DETAILED DESCRIPTION OF THE INVENTION

The present invention provides for a process for producing a purified gaseous product. The impurities removed are $H_2O$, $H_2$, CO and $CO_2$. In optional embodiments of the invention, oxides of nitrogen and trace hydrocarbons are also removed from the finished gaseous product.

Referring to the drawings, in particularly FIG. 1, there is shown a process for production of purified gas. A feed gas stream, for example atmospheric air, is passed via a line 2 to a compressor 4 wherein the gas is compressed to about 50 to 300 psig. The compressed gas stream is sent via a line 6 to a heat exchanger 8 wherein it is cooled prior to introduction via line 10 into a water separator 12 to remove liquid water therefrom. The effluent from the water separator 12 is a temperature of from about 5° C. to about 70° C. and is preferably in the range of about 20° C. to about 45° C.

The gas is sent via line 14 through valve 16 and a carbon dioxide removal zone 18 and a line 20 to a treatment zone 25 within a single vessel 30 which contains a first adsorption zone 32, a first catalytic zone 34, a second adsorption zone 36, a second catalytic zone 38 and a third adsorption zone 40. In the alternative embodiment, zones 34 and 36 are switched such that the second adsorption zone follows the first adsorption zone 32.

The first adsorption zone 32 contains at least one bed of water-removing adsorbent material such as activated alumina, silica gel, zeolites and/or combinations thereof. Most of the water vapor present in the compressed gas must be removed in order to prevent deactivation of later catalytic layers. The adsorption zone 32 preferably comprises a layer of activated alumina or silica gel and a layer of zeolite such as zeolite 13X or 5A available from UOP, Inc.

The gas stream then enters the first catalytic zone 34 wherein carbon monoxide is converted to carbon dioxide. Preferably the catalyst material is a metal oxide such as nickel oxide or a mixture of the oxides of manganese and copper. Most preferably, a hopcalite-type catalyst is employed such as CARULITE-300 catalyst manufactured by Carus.

The thus treated gas enters the second adsorption layer 36 whereby $CO_2$ is removed from the gas stream. The adsorbent is selected from activated alumina, silica gel, zeolites and/or combinations of them. Preferably the treated gas contains no more than about 1.0 ppm carbon dioxide. This treated gas thus enters the second catalytic zone 38 wherein the hydrogen present in the gas is converted to water vapor. The catalysts useful in this layer include supported palladium and other noble metal catalysts known in the art. Preferably, this is an eggshell type Pd catalyst such as that available from Engelhard.

The last layer 40 comprises the third adsorption zone wherein water vapor is removed from the treated gas stream. In the embodiment where layers 34 and 36 are exchanged, it is also necessary to have a carbon dioxide adsorbent present in layer 40. Accordingly, the adsorbent can be activated alumina, silica gel, zeolites and/or mixtures thereof.

In an alternative embodiment, an additional adsorbent layer may be added after the carbon dioxide adsorption step. This layer may be an adsorbent such as a zeolite.

The thus treated gas exits the treatment vessel through line 42 and a valve 44 wherein it may be sent for storage via line 46 or through line 48 where it is sent for further processing as by a cryogenic distillation unit through line 48 to a heat exchanger 50 then through line 51 which leads to a typical feed for a cryogenic distillation unit.

The invention will now be described with respect to particular examples thereof which should not be construed as limiting the scope thereof.

EXAMPLES

Example 1
$H_2$ Breakthrough Experiment with $CO_2$ Containing Dry Air Feed (Run No. 1)

An 1" ID vessel packed with 13X/Pd-AA/CARULITE-300 hopcalite-type catalyst/AA (from top to bottom) was used to evaluate the $H_2$ removal performance of Pd/AA catalyst. The adsorbents and catalysts were first regenerated at 200° C. with a dry air stream free of $H_2$, CO and $CO_2$, followed with cooling to ambient temperature with the same regeneration gas stream. A dry air feed stream, which contained about 400 ppm $CO_2$, 3128 ppb $H_2$ and 214 ppb CO was then introduced to the reactor at 18° C. and 180 psia from the bottom of the bed. $H_2$ and CO concentrations exiting the Pd/AA catalyst layer were measured by a RGA-5 analyzer to determine the breakthrough time for both $H_2$ and CO.

Example 2
$H_2$ Breakthrough Experiment with $CO_2$ Free Dry Air Feed (Run No. 2)

A similar $H_2$ breakthrough experiment as described in Example 1 was carried out with $CO_2$ free dry air as feed to demonstrate the Pd/AA catalyst performance enhancement using $CO_2$ free dry air. The feed air stream contained 3186 ppb $H_2$ and 232 ppb CO. Similar $H_2$ and CO breakthrough curves were measured. The results obtained in both experimental runs are summarized in Table I below.

TABLE I

| $H_2$ Catalyst Performance | | |
|---|---|---|
| | Run No. 1 | Run No. 2 |
| Feed Pressure (psia) | 180 | 180 |
| Feed Temp. (° C.) | 18 | 18 |
| Feed Velocity (ft/s) | 0.47 | 0.47 |
| $H_2O$ in Feed (ppm) | <5 | <5 |
| CO in Feed (ppb) | 214 | 232 |
| $H_2$ in Feed (ppb) | 3128 | 3186 |
| $CO_2$ in Feed (ppm) | ~400 | <0.1 |
| Analyzer LDL for $H_2$ (ppb) | 2 | 2 |
| $H_2$ Breakthrough Time (min.) | 75 | 400 |

As demonstrated in Table I, hydrogen breakthrough time is extended from 75 minutes with carbon dioxide containing feed in Run No. 1 to 400 minutes with carbon dioxide free feed in Run No. 2 as clearly suggested that the Pd/AA catalyst performance can be greatly enhanced if there is no carbon dioxide in the feedstream when it enters the Pd/AA catalyst layer.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A temperature swing adsorption process for producing a gaseous product substantially purified from impurities comprising
   a) removing water vapor from a gaseous feedstream containing impurities;
   b) contacting said gaseous feedstream with an oxidation catalyst to convert carbon monoxide to carbon dioxide;
   c) removing carbon dioxide from said gaseous feedstream of steps (a) and (b);
   d) contacting said gaseous feedstream of step (c) with an oxidation catalyst to convert hydrogen to water vapor; and
   e) removing water vapor from said gaseous feedstream of step (d), thereby obtaining said substantially purified gaseous product.

2. The process as claimed in claim 1 wherein said gaseous feedstream is air.

3. The process as claimed in claim 1 wherein said impurities are selected from the group consisting of hydrogen, water vapor, carbon monoxide and carbon dioxide.

4. The process as claimed in claim 1 wherein step (a) comprises contacting said gaseous feed stream with a water vapor removing adsorbent.

5. The process as claimed 4 in claim wherein said water vapor removing adsorbent is selected from the group consisting of activated alumina, silica gel, zeolites and combinations thereof.

6. The process as claimed in claim 1 wherein said oxidation catalyst of step (b) is a mixture of manganese and copper oxides.

7. The process as claimed in claim 1 wherein step (c) comprises contacting said gaseous feedstream with a carbon dioxide removing adsorbent.

8. The process as claimed in claim 7 wherein said carbon dioxide removing adsorbent is selected from the group consisting of zeolites, activated alumina, silica gel and combinations thereof.

9. The process as claimed in claim 1 wherein said oxidation catalyst of step (d) is a noble metal catalyst.

10. The process as claimed in claim 9 wherein said noble metal catalyst is supported palladium.

11. The process as claimed in claim 1 wherein step (e) comprises contacting said gaseous feedstream with a water vapor removing adsorbent.

12. The process as claimed in claim 11 wherein said water vapor removing adsorbent is selected from the group consisting of activated alumina, silica gel, zeolites and combinations thereof.

13. The process as claimed in claim 1 further comprising contacting said gaseous feedstream with an adsorbent to remove hydrocarbons and oxides of nitrogen.

14. The process as claimed in claim 1 further comprising the step of cryogenically separating the components of step (e).

15. The process as claimed in claim 1 wherein the regeneration gas for the thermal swing adsorption process is free of $H_2$, CO, $CO_2$, $H_2O$, oxides of nitrogen and hydrocarbons and is obtained from a cryogenic separation unit.

* * * * *